US011695913B1

(12) United States Patent
Topliss et al.

(10) Patent No.: US 11,695,913 B1
(45) Date of Patent: Jul. 4, 2023

(54) MIXED REALITY SYSTEM

(71) Applicant: Apple Inc., Cupertino, CA (US)

(72) Inventors: Richard J. Topliss, Campbell, CA (US); Thomas M. Gregory, Cambridge (GB); Paul J. Gelsinger-Austin, Santa Clara, CA (US); Richard H. Tsai, Cupertino, CA (US)

(73) Assignee: Apple, Inc., Cupertino, CA (US)

( * ) Notice: Subject to any disclaimer, the term of this patent is extended or adjusted under 35 U.S.C. 154(b) by 0 days.

(21) Appl. No.: 17/472,419

(22) Filed: Sep. 10, 2021

Related U.S. Application Data

(63) Continuation of application No. 16/056,198, filed on Aug. 6, 2018, now Pat. No. 11,122,256.
(Continued)

(51) Int. Cl.
*H04N 7/18* (2006.01)
*H04N 13/344* (2018.01)
(Continued)

(52) U.S. Cl.
CPC ....... *H04N 13/344* (2018.05); *G02B 27/0172* (2013.01); *H04N 9/3129* (2013.01);
(Continued)

(58) Field of Classification Search
CPC ...... H04N 7/18; H04N 13/344; H04N 13/383; H04N 13/398; H04N 9/3129;
(Continued)

(56) References Cited

U.S. PATENT DOCUMENTS 8,120,828 B2   2/2012  Schwerdtner
8,686,923 B2   4/2014  Eberl et al.
(Continued)

FOREIGN PATENT DOCUMENTS

EP         0574005        12/1993
KR      20070012150        1/2007
(Continued)

OTHER PUBLICATIONS

U.S. Appl. No. 16/526,896, filed Jul. 30, 2019, Richard J. Topliss.
(Continued)

*Primary Examiner* — Trang U Tran
(74) *Attorney, Agent, or Firm* — Robert C. Kowert; Kowert, Hood, Munyon, Rankin & Goetzel, P.C.

(57) ABSTRACT

A mixed reality direct retinal projector system that may include a headset that uses a reflective holographic combiner to direct light from a light engine into an eye box corresponding to a user's eye. The light engine may include light sources coupled to projectors that independently project light to the holographic combiner from different projection points. The light sources may be in a unit separate from the headset that may be carried on a user's hip, or otherwise carried or worn separately from the headset. Each projector may include a collimating and focusing element, an active focusing element, and a two-axis scanning mirror to project light from a respective light source to the holographic combiner. The holographic combiner may be recorded with a series of point to point holograms; each projector interacts with multiple holograms to project light onto multiple locations in the eye box.

20 Claims, 15 Drawing Sheets

Related U.S. Application Data

(60) Provisional application No. 62/542,257, filed on Aug. 7, 2017.

(51) Int. Cl.
  *H04N 13/383* (2018.01)
  *H04N 13/398* (2018.01)
  *H04N 9/31* (2006.01)
  *G02B 27/01* (2006.01)

(52) U.S. Cl.
  CPC ......... *H04N 9/3161* (2013.01); *H04N 13/383* (2018.05); *H04N 13/398* (2018.05); *G02B 2027/0112* (2013.01); *G02B 2027/0134* (2013.01); *G02B 2027/0174* (2013.01)

(58) Field of Classification Search
  CPC .............. H04N 9/3161; G02B 27/0172; G02B 2027/0112; G02B 2027/0134; G02B 2027/0174
  USPC ........................................................ 348/53, 77
  See application file for complete search history.

(56) References Cited

U.S. PATENT DOCUMENTS

| | | | |
|---|---|---|---|
| 9,427,154 B2 | 8/2016 | Eberl et al. | |
| 9,594,247 B2 | 3/2017 | Maimone et al. | |
| 9,846,307 B2 | 12/2017 | Tremblay et al. | |
| 9,904,051 B2 | 2/2018 | Aleem et al. | |
| 9,989,764 B2 | 6/2018 | Alexander et al. | |
| 10,151,926 B2 * | 12/2018 | Bailey ................. | G02B 27/0172 |
| 10,282,906 B2 * | 5/2019 | Yonekubo ............ | G02B 6/0076 |
| 10,365,550 B2 | 7/2019 | Holland et al. | |
| 10,942,359 B2 * | 3/2021 | Pierer ................. | H01S 5/02224 |
| 2010/0149073 A1 | 6/2010 | Chaum et al. | |
| 2011/0157667 A1 | 6/2011 | Lacoste et al. | |
| 2013/0278631 A1 | 10/2013 | Border et al. | |
| 2015/0235463 A1 | 8/2015 | Schowengerdt | |
| 2016/0033771 A1 | 2/2016 | Tremblay | |
| 2016/0089024 A1 | 3/2016 | Katashiba | |
| 2016/0238845 A1 | 8/2016 | Alexander et al. | |
| 2016/0274365 A1 | 9/2016 | Bailey et al. | |
| 2016/0349514 A1 | 12/2016 | Alexander | |
| 2017/0111619 A1 | 4/2017 | Benosman | |
| 2017/0202457 A1 | 7/2017 | Swan et al. | |
| 2017/0214907 A1 | 7/2017 | Lapstun | |
| 2017/0299870 A1 | 10/2017 | Urey et al. | |
| 2017/0299956 A1 * | 10/2017 | Holland ................. | G02B 27/14 |
| 2018/0107103 A1 | 4/2018 | Holland et al. | |
| 2018/0246336 A1 | 8/2018 | Greenberg | |

FOREIGN PATENT DOCUMENTS

| | | |
|---|---|---|
| WO | 2017059379 | 6/2017 |
| WO | 201857660 | 3/2018 |

OTHER PUBLICATIONS

U.S. Appl. No. 16/359,924, filed Mar. 20, 2019, Richard J. Topliss.

* cited by examiner

MIXED REALITY SYSTEM

This application is a continuation of U.S. patent application Ser. No. 16/056,198, filed Aug. 6, 2018, which claims benefit of priority to U.S. Provisional Application Ser. No. 62/542,257, entitled "MIXED REALITY SYSTEM," filed Aug. 7, 2017, and which are incorporated herein by reference in their entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Mixed reality (MR) covers a spectrum from augmented reality (AR) systems that combine computer generated information (referred to as virtual content) with views of the real world to augment, or add virtual content to, a user's view of their real environment (referred to as), to augmented vitality (AV) systems that combine representations of real world objects with views of a computer generated three-dimensional (3D) virtual world. The simulated environments of virtual reality systems and/or the mixed environments of mixed reality systems may thus be utilized to provide an interactive user experience for multiple applications, such as applications that add virtual content to a real-time view of the viewer's environment, applications that generate 3D virtual worlds, interacting with virtual training environments, gaming, remotely controlling drones or other mechanical systems, viewing digital media content, interacting with the Internet, exploring virtual landscapes or environments, or the like.

However, conventional VR and MR systems may suffer from accommodation-convergence mismatch problems that cause eyestrain, headaches, and/or nausea. Accommodation-convergence mismatch arises when a VR or MR system effectively confuses the brain of a user by generating scene content that does not match the depth expected by the brain based on the stereo convergence of the two eyes of the user. For example, in a stereoscopic system the images displayed to the user may trick the eye(s) into focusing at a far distance while an image is physically being displayed at a closer distance. In other words, the eyes may be attempting to focus on a different image plane or focal depth compared to the focal depth of the projected image, thereby leading to eyestrain and/or increasing mental stress. Accommodation-convergence mismatch problems are undesirable and may distract users or otherwise detract from their enjoyment and endurance levels (i.e. tolerance) of virtual reality or mixed reality environments.

SUMMARY

Various embodiments of a mixed reality (MR) direct retinal projector system that may include an MR headset (e.g., a helmet, goggles, or glasses) that uses a reflective holographic combiner to direct light from multiple projectors of a light engine into an eye box corresponding to the user's eye, while also transmitting light from the user's environment to thus provide an augmented or mixed view of reality. The holographic combiner may be recorded with a series of point to point holograms; each projector interacts with multiple holograms to project light onto multiple locations (referred to as eye box points) in the eye box. The holograms may be arranged so that neighboring eye box points are illuminated by different projectors. The holographic combiner may be implemented by a relatively flat lens when compared to curved reflective mirrors used in other direct retinal projector systems.

The light engine may include light sources (e.g., laser diodes, LEDs, etc.) coupled to projectors that independently project light to the holographic combiner from different projection points. In some embodiments, there may be three light sources coupled to three projectors for each eye; however, more or fewer light sources and projectors may be used in some embodiments. Each light source may be an RGB light source (e.g., an RGB laser). In some embodiments, the projectors may be components of or mounted on the MR headset, and the light sources may be contained in a control box separate from the headset that may, for example, be carried on a user's hip, in a backpack, or otherwise carried or worn separately from the headset worn by the user. The control box may also contain a controller and power supply for the MR system. The light sources may be coupled to the projectors via fiber optic cables, with each light source coupled to one of the projectors. Alternatively, in some embodiments, the controller, light sources, and the projectors may be contained in a unit that is a component of or mounted on the headset.

In some embodiments, each projector may include a collimating and focusing element to focus the light beam emitted by a respective light source (e.g., RGB laser) such that, once reflected off the holographic combiner, the light is substantially collimated when it enters the subject's eye. In some embodiments, each projector may include a two-axis scanning mirror to scan the focused light from a respective light source to the holographic combiner; the light source may be appropriately modulated under control of the controller to generate a desired image. In some embodiments, each projector may include an active focusing element that may, for example, be used to change focus of the light beam as the light beam is scanned across a slow (horizontal) axis by the scanning mirror. This may also enable beams that diverge into the eye to, rather than being collimated, match the beam divergence of the supposed depth of the virtual object(s) being projected by the light engine.

In some embodiments, the MR headset may include a gaze tracking component implemented according to any of a variety of gaze tracking technologies that may, for example, provide gaze tracking input to the controller so that the light beams projected by the light engine can be adjusted according to the current position of the subject's eyes. For example, different ones of the light sources and projectors may be activated to project light onto different eye box points based on the current position of the subject's eyes.

Figure 1:
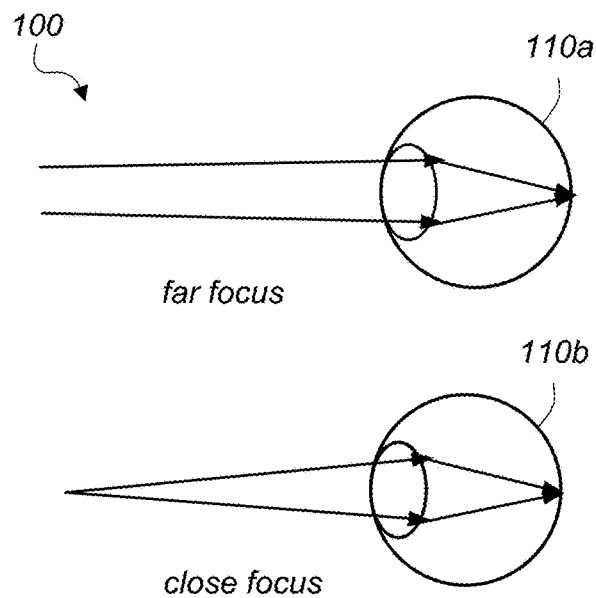
FIG. 1 is an example of different types of eye focus.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in a manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of a mixed reality (MR) direct retinal projector system are described that may, for example, resolve the convergence-accommodation conflict in head-mounted AR, MR, and VR systems. Embodiments of an MR headset (e.g., a helmet, goggles, or glasses) are described that may include or implement different techniques and components of the MR system. In some embodiments, an MR headset may include a reflective holographic combiner to direct light from multiple (e.g., three) projectors of a light engine into an eye box corresponding to the user's eye, while also transmitting light from the user's environment to thus provide an augmented or mixed view of reality. The holographic combiner may be recorded with a series of point to point holograms; each projector interacts with multiple holograms to project light onto multiple locations (referred to as eye box points) in the eye box. The holograms may be arranged so that neighboring eye box points are illuminated by different projectors. In some embodiments, only one projector is active at a given time; when activated, a projector projects light from a corresponding light source (e.g., an RGB laser) to all of its eye box points. However, in some embodiments, more than one projector, or all of the projectors, may be active at the same time.

The light engine may include light sources (e.g., laser diodes, LEDs, etc.) coupled to projectors that independently project light to the holographic combiner from different projection points. In some embodiments, there may be three light sources coupled to three projectors for each eye; however, more or fewer light sources and projectors may be used in some embodiments. Each light source may be an RGB light source (e.g., an RGB laser). In some embodiments, the projectors may be components of or mounted on the MR headset, and the light sources may be contained in a control box separate from the headset that may, for example, be carried on a user's hip, in a backpack, or otherwise carried or worn separately from the headset worn by the user. The control box may also contain a controller and power supply for the MR system. The light sources may be coupled to the projectors via fiber optic cables, with each light source coupled to one of the projectors. Alternatively, in some embodiments, the controller, light sources, and the projectors may be contained in a unit that is a component of or mounted on the headset.

In some embodiments, each projector may include a collimating and focusing element to focus the light beam emitted by a respective light source (e.g., an RGB laser light source) such that, once reflected by the holographic combiner, the light is substantially collimated when it enters the subject's eye. In some embodiments, each projector may include a two-axis scanning mirror to scan the focused light from a respective light source to the holographic combiner; the light source may be appropriately modulated under control of the controller to generate a desired image. In some embodiments, each projector may include an active focusing element that may, for example, be used to change focus of the light beam as the light beam is scanned across a slow (horizontal) axis by the scanning mirror. This may also enable beams that diverge into the eye to, rather than being collimated, match the beam divergence of the supposed depth of the virtual object(s) being projected by the light engine.

In some embodiments, the MR headset may include a gaze tracking component implemented according to any of a variety of gaze tracking technologies that may, for example, provide gaze tracking input to the controller so that the light beams projected by the light engine can be adjusted according to the current position of the subject's eyes. For example, different ones of the light sources and projectors may be activated to project light onto different eye box points based on the current position of the subject's eyes.

Accommodation and Convergence in MR/VR Systems

The human brain typically uses two cues to gauge distance: accommodation (i.e., eye focus) and eye convergence (i.e., the stereoscopic perspective difference between the two eyes). Conventional near-eye systems typically use separate miniature screens for each respective eye to project the images intended for the left eye and the right eye, as well as optics to allow a user to comfortably focus the eyes at a far distance during viewing of the left eye and right eye images. Conventional near-eye systems thus produce conflicting visual cues since the resulting three-dimensional (3D) image produced by the brain effectively appears at a convergence distance that is closer than the accommodation distance that each eye focuses on separately, thereby leading to the possibility of headache and/or nausea over time. Heavy users of conventional systems may potentially train themselves to compensate for accommodation-convergence mismatch, but a majority of users might not.

Mixed reality (MR) systems typically add information and graphics to an existing scene being viewed by a user. In some embodiments, MR may be a powerful experience, since the user can see both the projected images and/or sprites (i.e., the augmented world) as well as the surrounding scene (i.e., the real world) directly through the MR system rather than using camera systems to project a version of the surrounding scene less accurately onto screen displays for each eye.

FIG. 1 depicts an example of different types of eye focus. In system 100 of FIG. 1, an eye 110A may be selectively configured to focus at a far distance, as shown by the incident light originating from a distant location and focusing onto the retina (i.e., the back internal surface) of eye 110A by the internal lens of eye 110A. In another embodiment, eye 110A may instead be selectively configured for a close focus scenario, as shown by light from a nearby location being incident upon the eye and focusing onto the retina.

Figure 2:
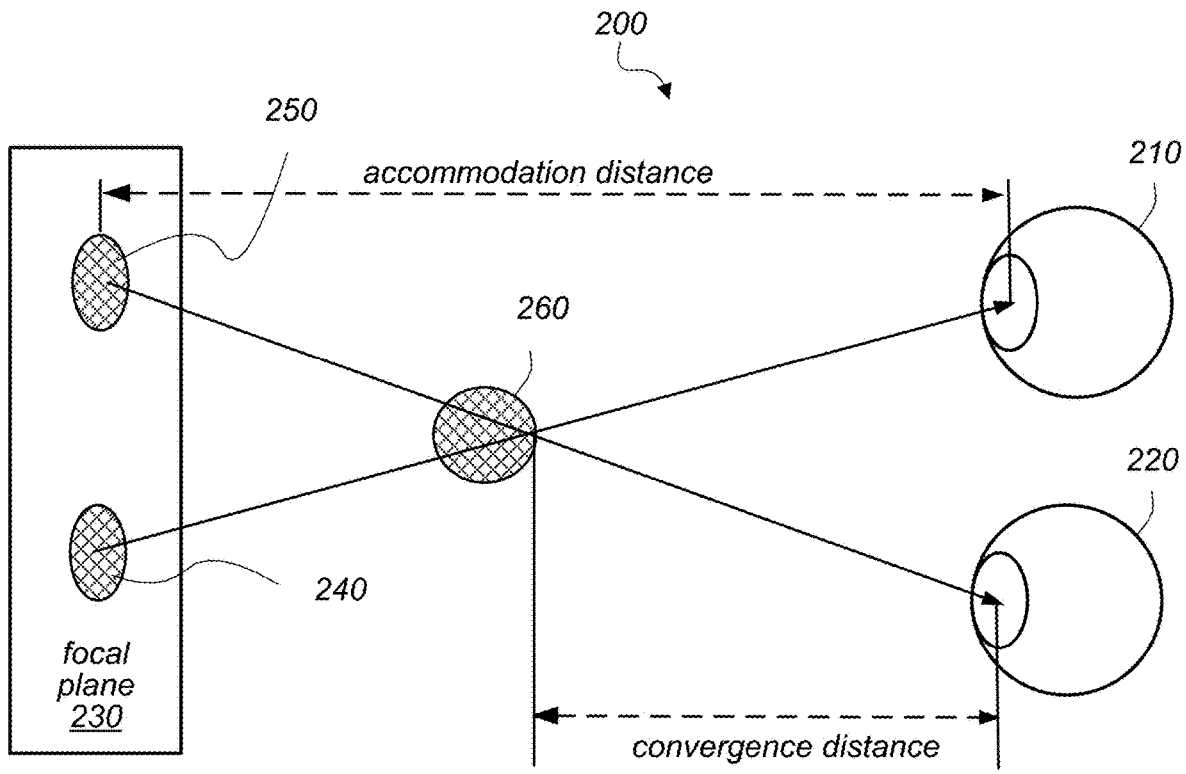
FIG. 2 illustrates one embodiment of a conventional near-eye virtual reality system.

FIG. 2 illustrates one embodiment of a conventional near-eye system 200. As depicted, right eye 210 and left eye 220 are focused on a focal plane 230 where an image for right eye 240 and an image for left eye 250, respectively, are displayed. As right eye 210 and left eye 220 focus on their respective images on focal plane 230, the brain of the user combines the images into a resulting 3D image 260. In one embodiment, the accommodation distance may be the distance between focal plane 230 and an eye of the user (e.g., right eye 210 and/or left eye 220), and the convergence distance may be the distance between resulting 3D image 260 and an eye of the user. Since, as depicted in FIG. 2, the accommodation distance differs from the convergence distance, conventional near-eye system 200 therefore results in an accommodation-convergence mismatch and may cause discomfort for the user as described above.

Figure 3:
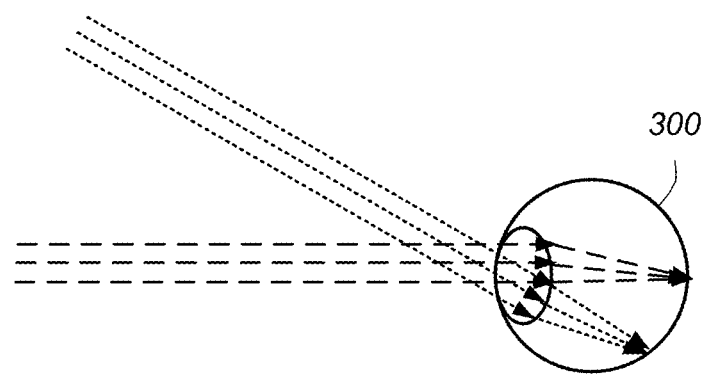
FIG. 3 illustrates an example of parallel light beams entering an eye.

FIG. 3 illustrates an example of parallel light beams entering an eye 300. As shown, various sets of parallel light beams that enter eye 300 are focused by eye 300 such that the parallel beams within a respective set land at the same place on the retina of eye 300.

Direct Retinal Projector System with Scanning Mirror and Ellipsoid Mirror

Figure 4:
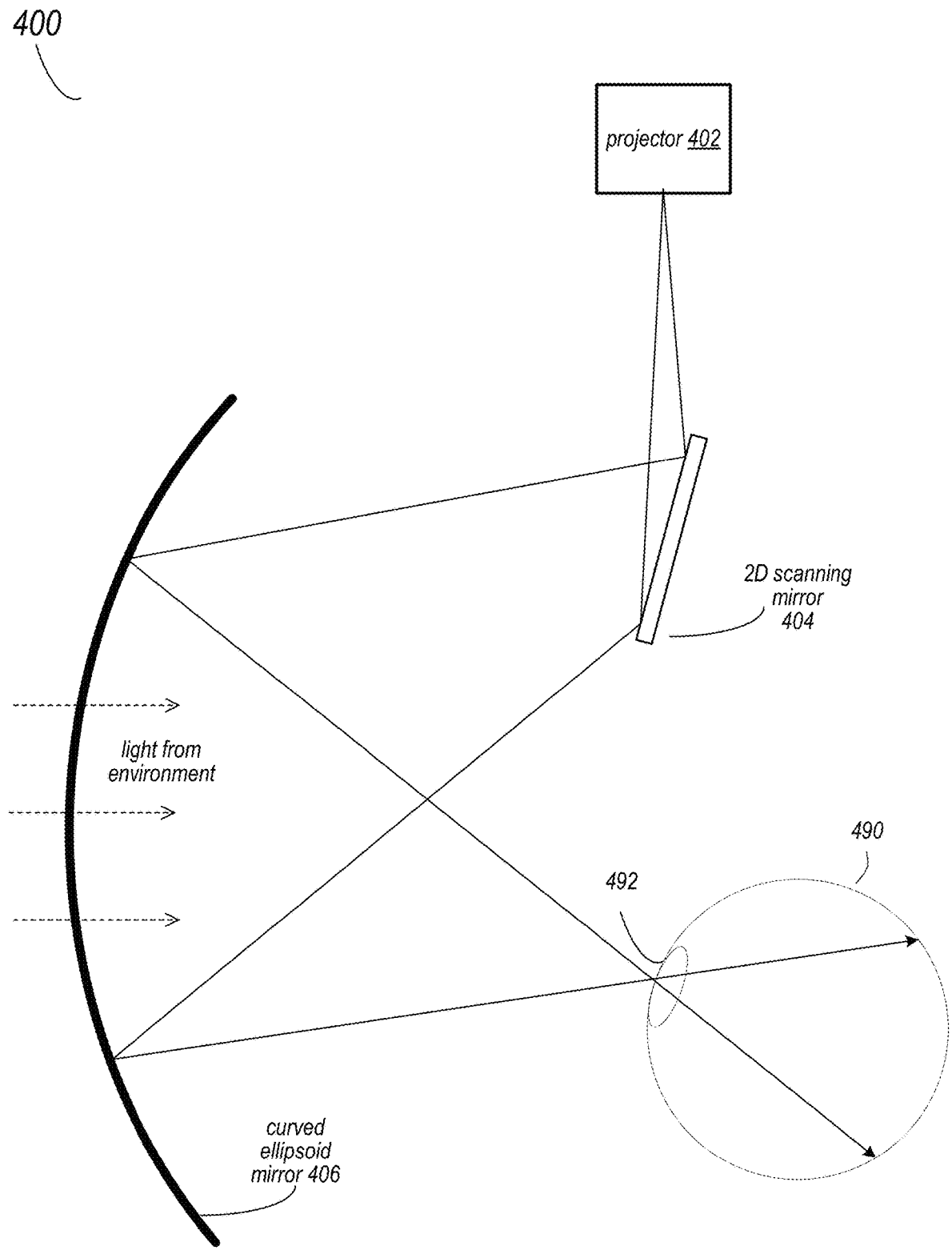
FIG. 4 illustrates a direct retinal projector system that uses a curved ellipsoid mirror to direct light from a projector into a subject's eye, while also transmitting light from the environment to the subject's eye.

A direct retinal projector system may be implemented as a headset (e.g., a helmet, goggles, or glasses) that includes a scanning projector, curved ellipsoid mirror, gaze tracking technology, and a secondary scanning mirror. FIG. 4 illustrates a direct retinal projector system 400 that scans virtual reality (VR) images, pixel, by pixel, to a subject's eye 490. In some embodiments, of a direct retinal projector system 400, under control of a controller (not shown), light beams are scanned by a scanning projector 402 to a secondary scanning mirror 404, and the light beams are then scanned by the scanning mirror 404 to different positions on a curved ellipsoid mirror 406 in front of the subject's eye 490 according to the current position of the subject's eye 490 as determined by gaze tracking technology (not shown), and reflected off the curved mirror 406 through the subject's pupil 492 to form the images on the subject's retina to thus provide a VR view to the subject. Unlike conventional screen-based VR/MR systems, there is no intermediate image on a screen or surface that the subject views. The direct retinal projector system 400 may at least partially eliminate eye lens accommodation from the retinal projection focus to help eliminate the accommodation convergence mismatch. In some embodiments, to provide an MR experience to the user, the curved mirror 406 may allow light from the subject's environment to pass through the mirror to the subject's eye 490 while simultaneously reflecting the light beams generated by the projector 402 to the subject's eye 490, thus enabling the subject to see elements of both an external (real) scene and the virtual reality (VR) images projected by the projector. Note that the direct retinal projector system 400 is shown for only one eye; generally but not necessarily, there will be a second direct retinal projector system 400 for the second eye.

In the direct retinal projector system 400 as illustrated in FIG. 4, the curved ellipsoid mirror 406 bulges outward significantly, and therefore the headset may be cumbersome and odd looking when worn by a user. In addition, the projector 402 may emit relatively small beams (e.g., 1 mm diameter) that may limit resolution, and the system 400 may have a relatively limited field of view. In addition, the system is mechanically complex; for example, the secondary scanning mirror 404 for adjusting for different eye positions adds complexity. Further, the projector 402 and scanning mirror 404 may be relatively large, further adding to the bulk of the headset.

Direct Retinal Projector MR System with Holographic Combiner

Embodiments of a direct retinal projector MR system are described that include an MR headset (e.g., helmet, goggles, or glasses) with reflective holographic combiners to direct light from light engines into the user's eyes, while also transmitting light from the user's environment to thus provide an augmented or mixed view of reality. The light engines may include multiple light sources (e.g., laser diodes, LEDs, etc.) coupled to projectors that independently project light to the holographic combiners from different projection points. The holographic combiners may, for example, be implemented as holographic films on relatively flat lenses when compared to the curved ellipsoid mirrors 406 of the system 400 as illustrated in FIG. 4, and thus do not bulge as do the mirrors 406 in that system, making the headset less bulky, more comfortable to wear, and more normal looking; the headset may, for example, be implemented as a relatively normal-looking pair of glasses. In some embodiments, the projectors may be components of or mounted on the MR headset, and the light sources may be contained in a control box separate from the headset that may, for example, be carried on a user's hip, in a backpack, or otherwise carried or worn separately from the headset worn by the user. The control box may also contain a controller and power supply for the MR system. The light sources may be coupled to the projectors via fiber optic cables, with each light source coupled to one of the projectors. Alternatively, in some embodiments, the controller, light sources, and the projectors may be contained in a unit that is a component of or mounted on the headset.

Embodiments of the MR system may not require extra moving parts or mechanically active elements such as scanning mirror 404 to compensate for the eye changing position in the eye box or for changing optical power from the holographic combiner during the scan, which simplifies the system architecture when compared to the direct retinal projector system of FIG. 4. Thus, the light engine may be implemented as a relatively small solid-state system, reducing the mechanical complexity and bulk of the MR headset when compared to a system as illustrated in FIG. 4.

Figure 5:
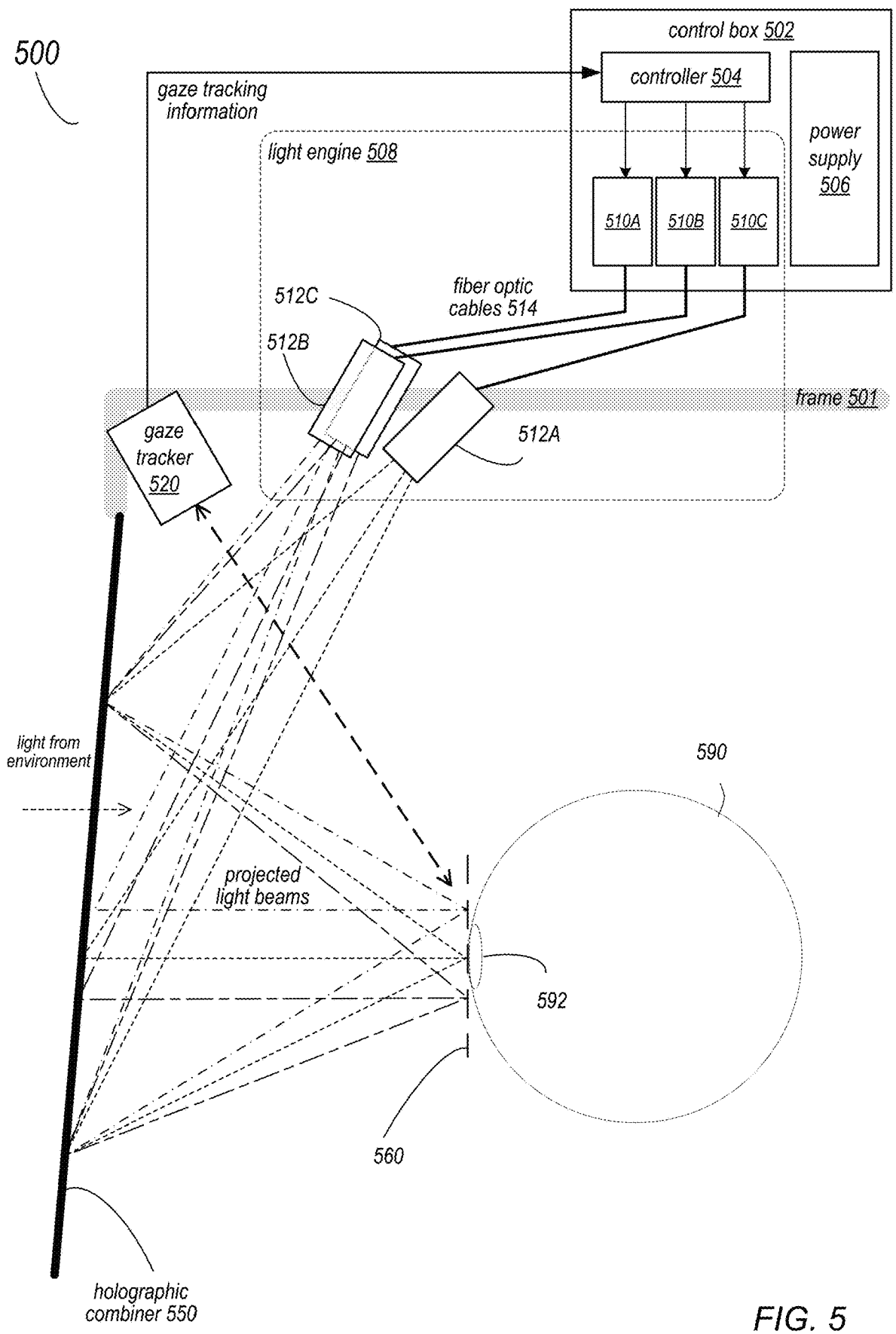
FIG. 5 illustrates a mixed reality (MR) system that uses a reflective holographic combiner to direct light from multiple projectors into a subject's eye, while also transmitting light from the environment to the subject's eye, according to some embodiments.
Figure 6:
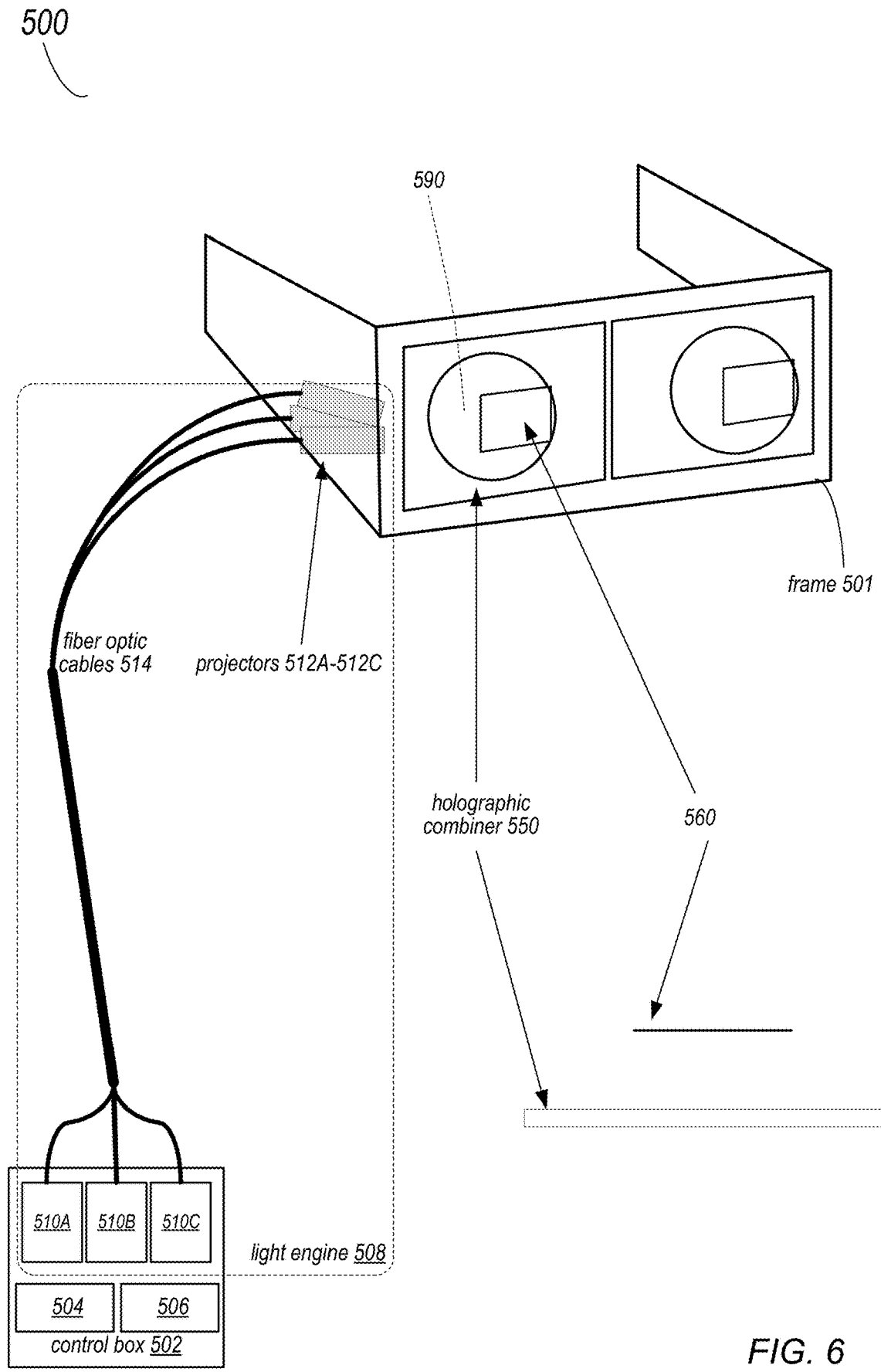
FIG. 6 illustrates an MR headset that includes a reflective holographic combiner to direct light from a light engine into a subject's eye, while also transmitting light from the environment to the subject's eye, according to some embodiments.
Figure 7:
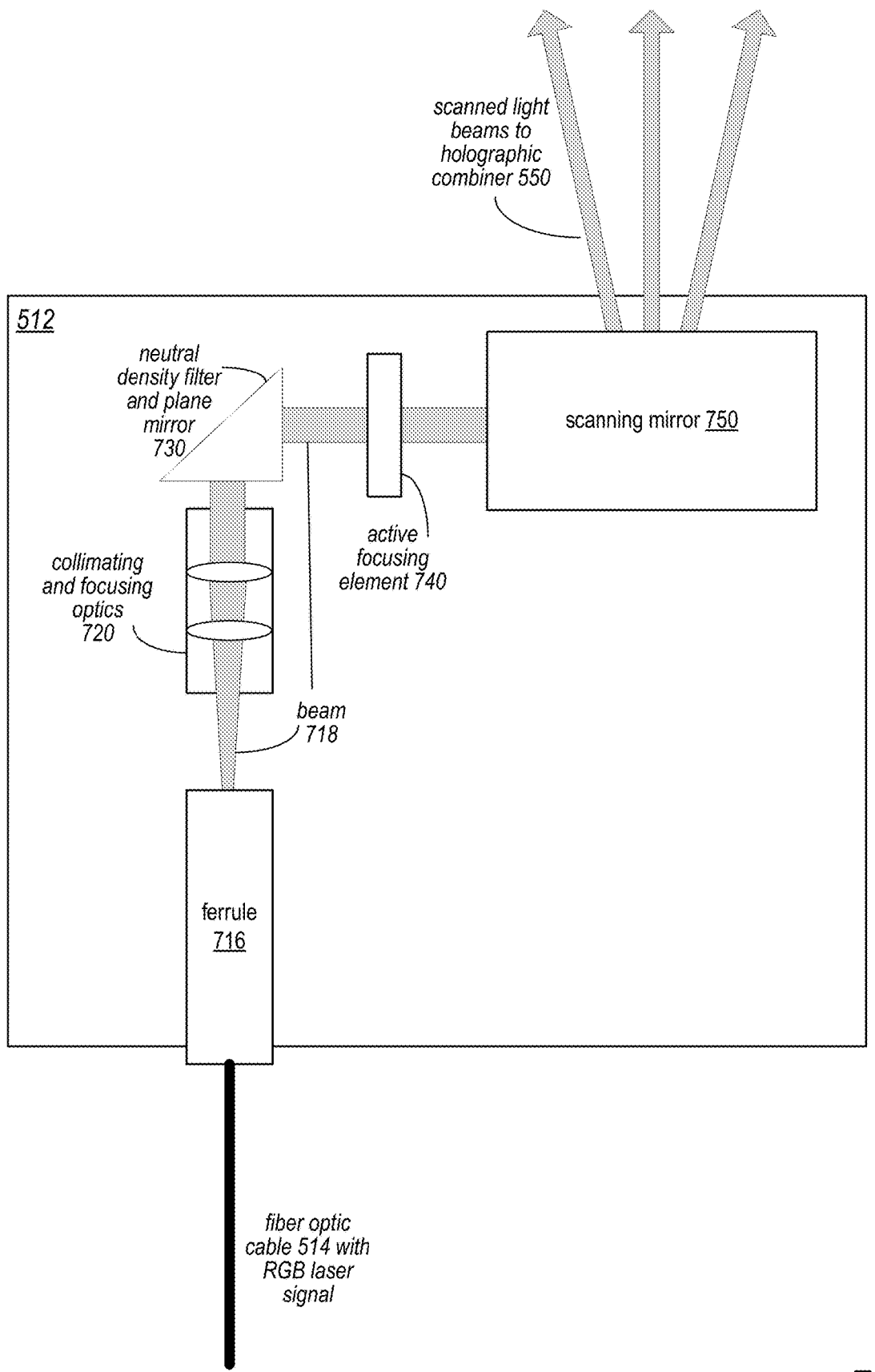
FIG. 7 illustrates components of a projector, according to some embodiments.
Figure 8:
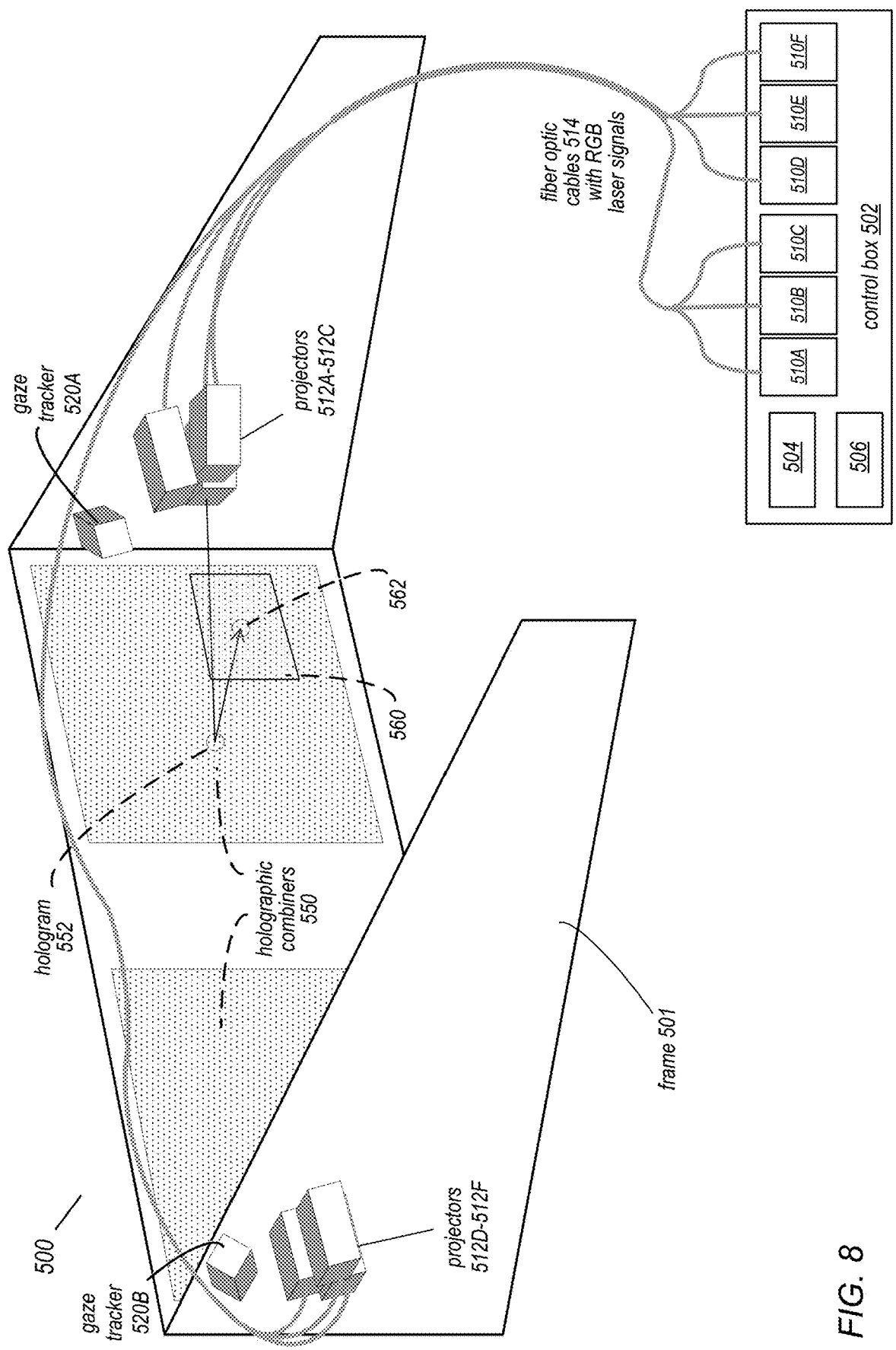
FIG. 8 illustrates an MR system that includes a headset with projectors and a separate control box containing light sources, according to some embodiments.
Figure 9:
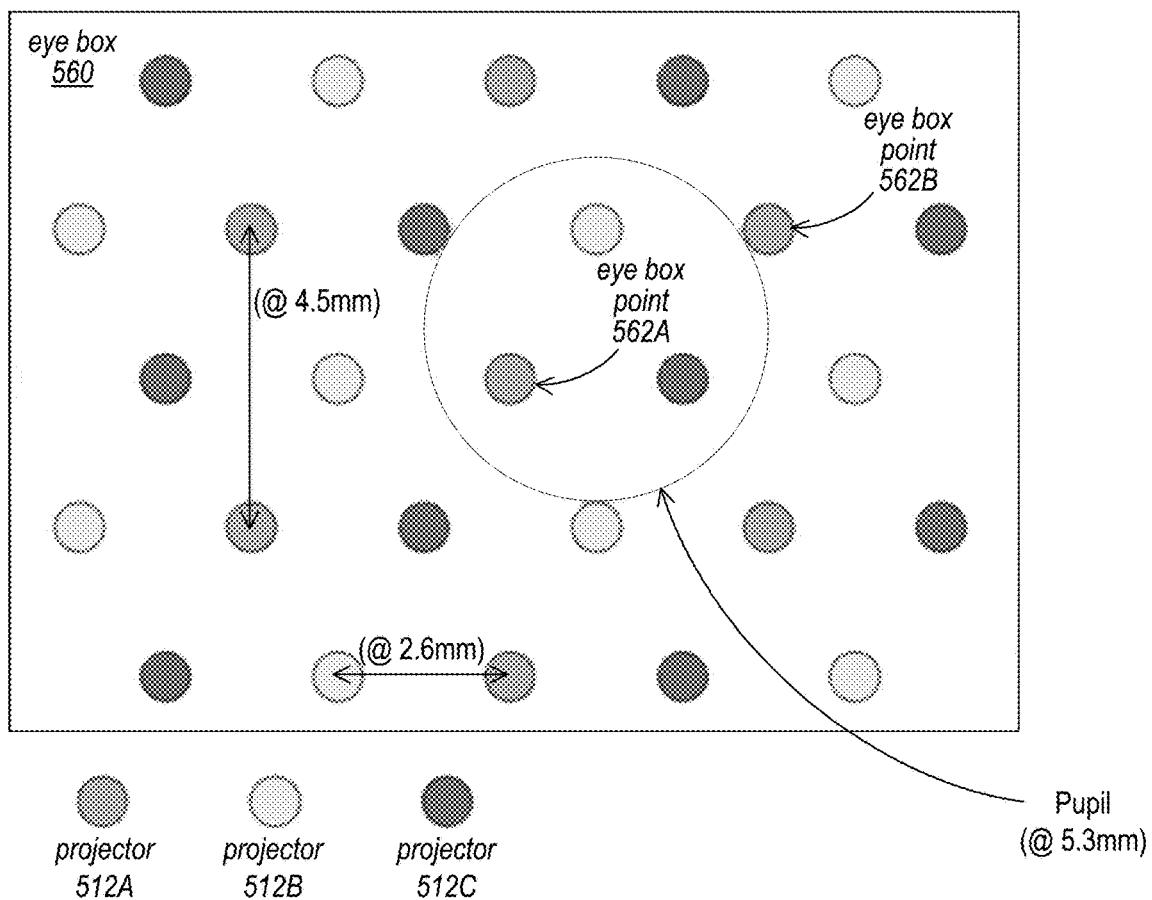
FIG. 9 illustrates an example eye box of an MR system, according to some embodiments.
Figure 10A:
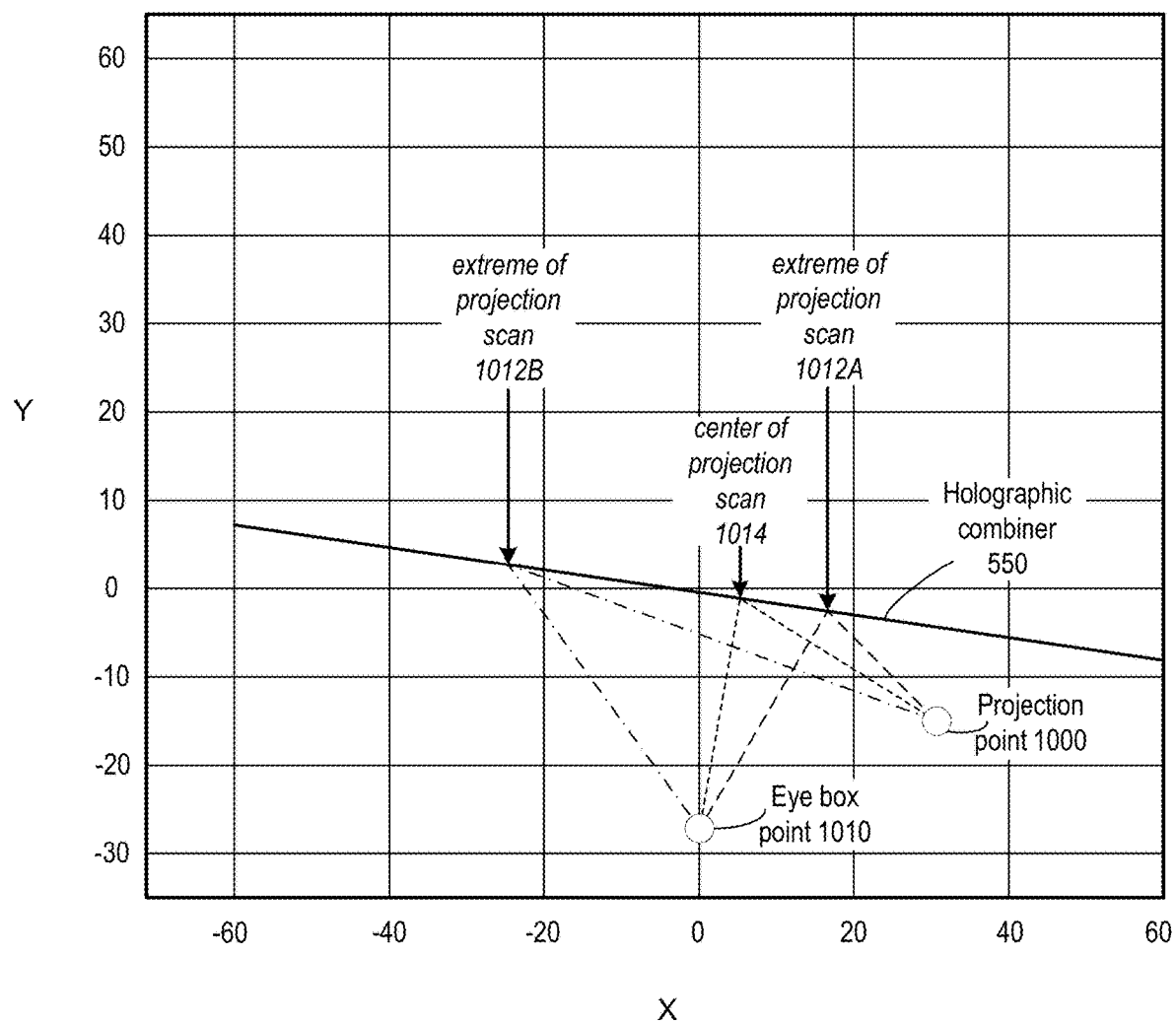
FIGS. 10A and 10B illustrate linear and non-linear slow axis scans in an MR system, according to some embodiments.
Figure 10B:
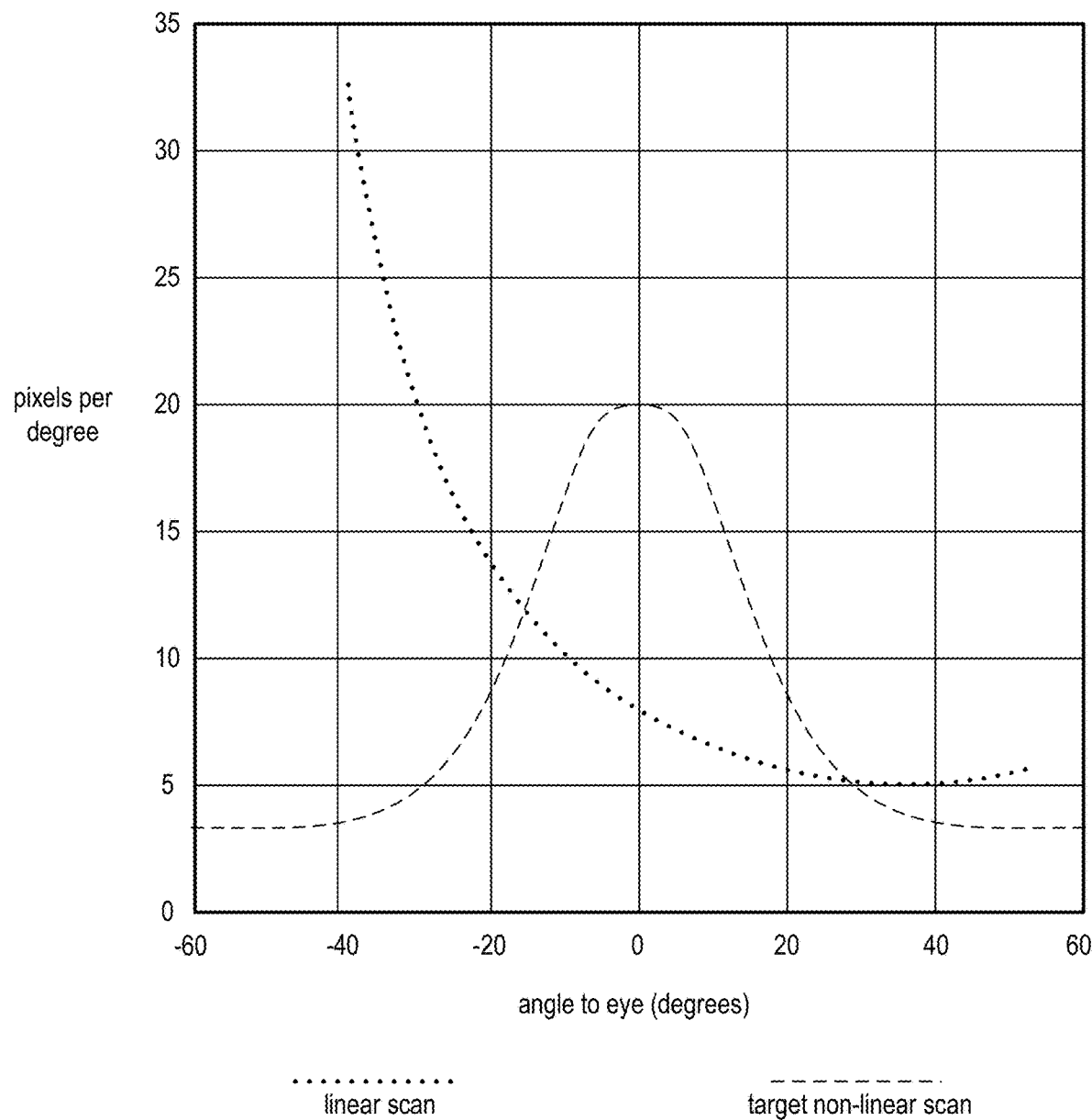
Figure 11:
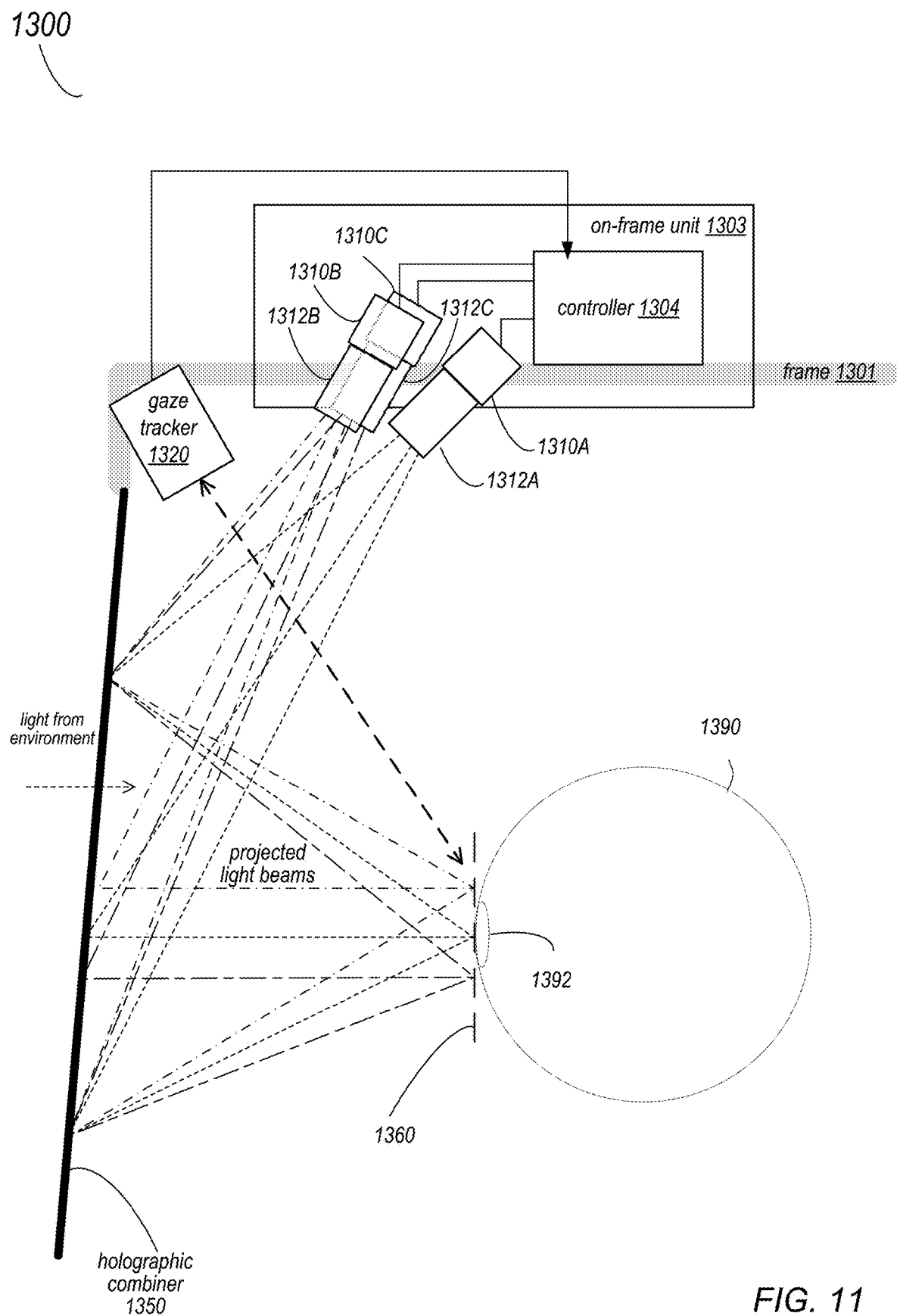
FIG. 11 illustrates an embodiment of an MR system in which the projectors and light sources are contained in an on-frame unit.
Figure 14A:
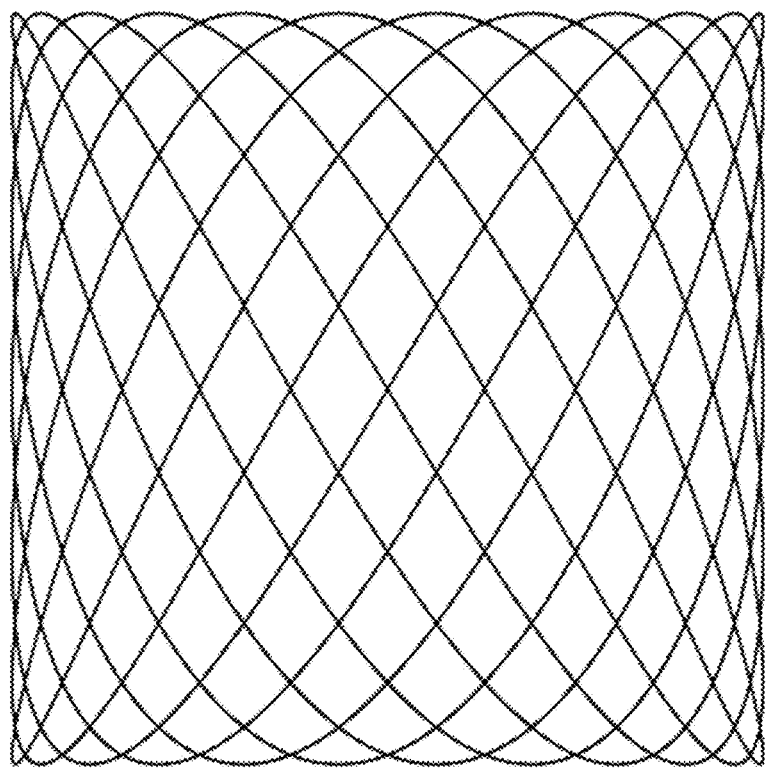
FIGS. 14A and 14B illustrate using resonance techniques on both axes of a scanning mirror, according to some embodiments.
Figure 14B:
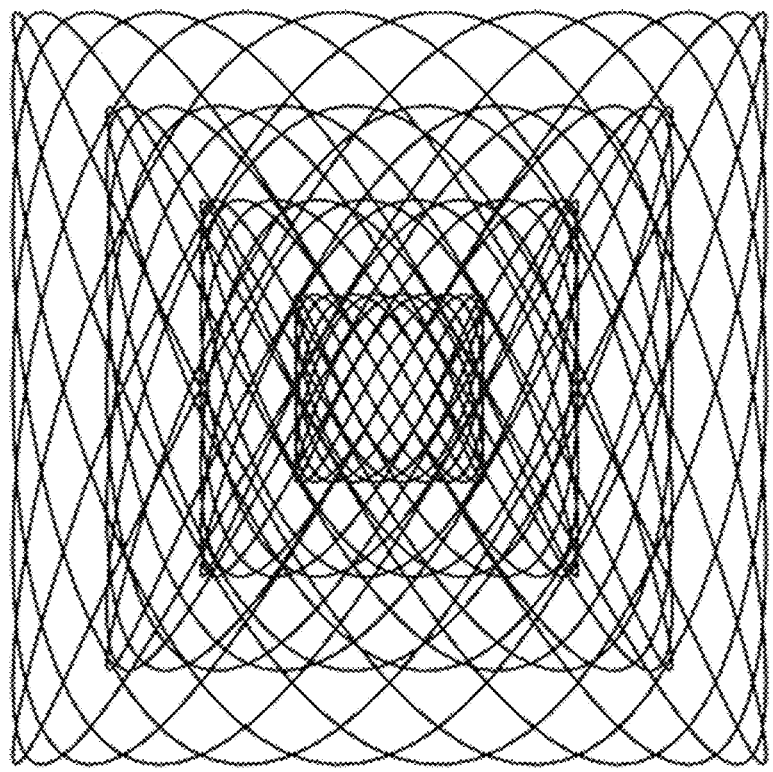
Figure 15:
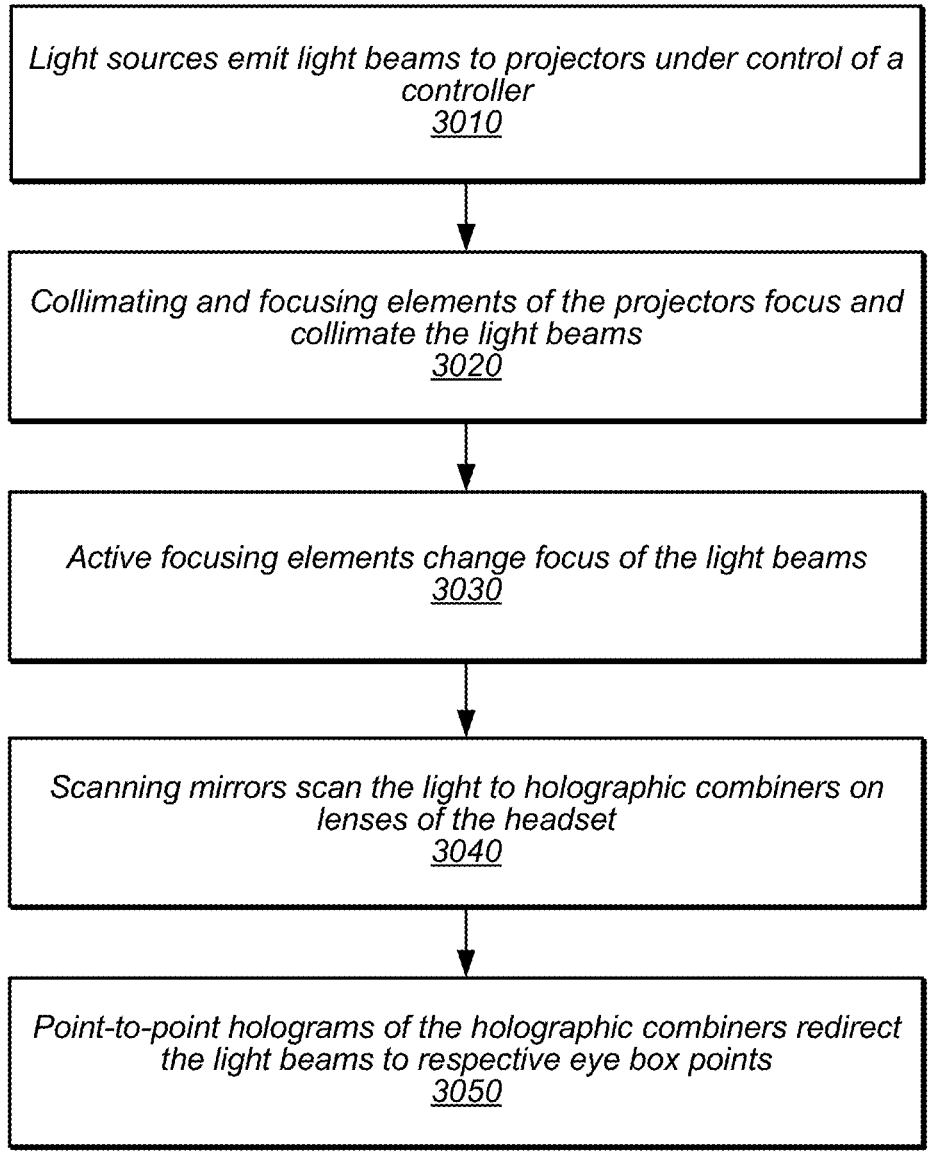
FIG. 15 is a high-level flowchart of a method of operation for an MR system as illustrated in FIGS. 5 through 11, according to some embodiments.

FIGS. 5 through 15 illustrate architecture, components, and operation of example embodiments of a direct retinal projector MR system. FIG. 15 is a high-level flowchart of a method of operation for an MR system as illustrated in FIGS. 5 through 11, according to some embodiments. Elements of FIG. 15 are explained in greater detail in FIGS. 5 through 11. As indicated at 3010, light sources (e.g., RGB lasers) emit light beams to projectors under control of a controller. In some embodiments, the light sources may be located in a control box and coupled to the projectors by fiber optic cables, for example as illustrated in FIG. 5. Alternatively, in some embodiments, the light sources may be coupled directly to the projectors in an on-frame unit, for example as illustrated in FIG. 11. As indicated at 3020, collimating and focusing optic elements of the projectors refract the light to focus and collimate the light beams, for example as illustrated in FIG. 7. As indicated at 3030, active focusing elements of the projectors may change the focus of the light beams, for example as illustrated in FIG. 7. As indicated at 3040, scanning mirrors (e.g., 2D scanning microelectromechanical systems (MEMS) mirrors) of the projectors scan the light beams to holographic combiners on lenses of the headset, for example as illustrated in FIG. 7. As indicated at 3050, point-to-point holograms of the holographic combiner redirect the light beams to respective eye box points, for example as illustrated in FIGS. 8 and 9. In some embodiments, the subject's pupil position may be tracked by a gaze tracking component, and the MR system may selectively illuminate different eye box points according to the tracking information by selectively activating different ones of the light sources and projectors, for example as illustrated in FIGS. 5 and 11.

FIGS. 5 and 6 illustrate a mixed reality (MR) system 500 that uses a reflective holographic combiner 550 to direct light projected by multiple projectors 512 into a subject's eye 590, while also transmitting light from the environment to the subject's eye 590, according to some embodiments. In some embodiments, the MR system 500 may include a headset (e.g., a helmet, goggles, or glasses as shown in FIG. 6) that includes a frame 501, multiple projectors 512 (three, in this example), a gaze tracking component (gaze tracker 520), and a lens that includes a holographic combiner 550, for example implemented as one or more layers of holographic film on either side of, or embedded in, the lens. The lens may be a piece of curved glass or plastic with optical power depending on the user's particular requirements, or alternatively a piece of flat or curved glass or plastic with no optical power. Note that, for simplicity, the system 500 is shown for only one eye; generally but not necessarily, there will be projectors 512, a gaze tracker 520, and a lens with holographic combiner 550 for the second eye.

In some embodiments, the MR system 500 may also include a separate control box 502 that includes multiple light sources 510 (three, in this example), and a controller 504 and power supply 506 for the MR system 500. The light sources 510 may, for example, be RGB lasers. The control box 502 may, for example, be worn on the user's hip, or otherwise carried or worn by the user. The light sources 510 may be coupled to the projectors 512 by fiber optic cables 514, with each light source 510 coupled to one projector 512. In some embodiments, the control box may include separate sets of light sources 510 for each eye 590, with the light sources 510 for each eye connected to the projectors 512 on respective sides of the frame 501 by fiber optic cables 514. The light sources 510, fiber optic cables 514, and projectors 512 for an eye 590 may be referred to as a light engine 508. Thus, the system 500 may include two light engines 508, with one for each eye.

The controller 504 may control operation of the light engine(s) 508. The controller 504 may be integrated in the control box 502, or alternatively may be implemented at least in part by a device (e.g., a personal computer, laptop or notebook computer, smartphone, pad or tablet device, game controller, etc.) coupled to the control box 502 via a wired or wireless (e.g., Bluetooth) connection. The controller 504 may include one or more of various types of processors, CPUs, image signal processors (ISPs), graphics processing units (GPUs), coder/decoders (codecs), memory, and/or other components. The controller 504 may, for example, generate virtual content for projection by the light engine(s) 508. The controller 504 may also direct operation of the light engine(s) 508, in some embodiments based at least in part on input from a gaze tracking 520 component(s) of the headset. The gaze tracking 520 component(s) may be implemented according to any of a variety of gaze tracking technologies, and may provide gaze tracking input to the controller 504 so that projection by the light engine(s) 508 can be adjusted according to current position of the subject's eye(s) 590. For example, different ones of the light sources 510 and projectors 512 may be activated to project light onto different eye box 560 points based on the current position of the subject's eyes.

In some embodiments, the holographic combiner 550 may be recorded with a series of point to point holograms; one projection point interacts with multiple holograms to project light onto multiple eye box 560 points. In some embodiments, the holograms are arranged so that neighboring eye box 560 points are illuminated from different projectors 512. In some embodiments, the holographic combiner 550 and projectors 512 of light engine 508 may be arranged to separately project light fields with different fields of view and resolution that optimize performance, system complexity and efficiency, so as to match the visual acuity of the eye.

In some embodiments, the light engine 508 may include multiple independent light sources 510 (e.g., laser diodes, LEDs, etc.) that may emit light beams, under control of the controller 504, that are independently projected by respective projectors 512. As shown in this example, in some embodiments, there may be three light sources 510A-510C coupled to three projectors 512A-512C by three fiber-optic cables 514A-514C; however, there may be more or fewer light sources, projectors, and connecting cables in some embodiments. In some embodiments, the projectors 512 may each include a two-axis scanning mirror (e.g., a MEMS mirror) that scans the light beam from a respective light source 510 to the holographic combiner 550. The light sources 510 may be appropriately modulated (e.g., by controller 504) to generate a desired image. In some embodiments, only one light source 510 and projector 512 (per eye) is active at a given time; when activated, a projector 512 projects light from a corresponding light source 510 (e.g., an RGB laser) to all of its eye box 560 points. However, in some embodiments, more than one light source 510 and projector 512, or all of the light sources 510 and projectors 512, may be active at the same time.

In some embodiments, each projector 512 may include optical elements that focus the light beam before scanning such that, once reflected off the holographic combiner 550, the light is substantially collimated when it enters the subject's eye 590. In some embodiments, each projector 512 may also include an active focusing element that may, for example, be used to change focus of the light beam as the light beam is scanned across a slow (horizontal) axis by the scanning mirror. Active focusing may also enable beams that diverge into the eye to, rather than being collimated, match the beam divergence of the supposed depth of the virtual object(s) being projected.

With the methods and components described above, the MR system 500 may not require extra moving parts or mechanically active elements to compensate for the eye 590 changing position in the eye box 560 or for the changing optical power from the holographic combiner 550 during the scan, which greatly simplifies the system architecture when compared to other direct retinal projector systems. Table 1 lists some example values for parameters of an example MR system 500 as illustrated in FIGS. 5 and 6, and is not intended to be limiting.

TABLE 1

| Parameter | Performance |
| --- | --- |
| Resolution | 18 PPD |
| Frame rate | 60 Hz |
| FOV at eye | 61° × 54° |

TABLE 1-continued

| Parameter | Performance |
| --- | --- |
| Eye-box size | 13 mm × 9 mm |
| Object focus | 0.2 m to infinity |

The architecture, components, and operation of an example MR system 500 as broadly illustrated in and described for FIGS. 5 and 6 are discussed below in greater detail in reference to FIGS. 7 through 11.

FIG. 7 illustrates components of a projector 512 in an MR system as illustrated in FIGS. 5 and 6, according to some embodiments. Projector 512 may include a ferrule 716 via which a fiber optic cable 514 from a light source 510 (e.g., an RGB laser light source) is connected to the projector 512 unit. In some embodiments, projector 512 may include collimating and focusing optics 720 that focus the light beam 718 emitted by the light source 510 such that, once reflected by the holographic combiner 550, the light beam 518 is substantially collimated when it enters the subject's eye 590. Optics 720 may, for example, include one or more refractive lenses. In some embodiments, each projector may include a two-axis scanning mirror (e.g., a microelectromechanical systems (MEMS) mirror) that scans the focused light beam 718 to the holographic combiner 550. In some embodiments, projector 512 may include a neutral density filter and plane mirror 730 that reflects the light beam 718 after focusing by optics 720 towards the scanning mirror 750. In some embodiments, projector 512 may include an active focusing element 740 located between optics 720 and scanning mirror 750 that may, for example, be used to change focus of the light beam 718 as the light beam 718 is scanned across a slow (horizontal) axis by the scanning mirror 750. This may also enable beams that diverge into the eye to, rather than being collimated, match the beam divergence of the supposed depth of the virtual object(s) being projected by the light engine 508.

FIG. 8 illustrates an MR system that includes a headset with projectors and a separate control box containing light sources, according to some embodiments. MR system 500 may use reflective holographic combiners 550 to direct light projected by multiple projectors 512 into a subject's eyes, while also transmitting light from the environment to the subject's eyes. In some embodiments, the MR system 500 may include a headset (e.g., a helmet, goggles, or glasses as shown in FIG. 8) that includes a frame 501, multiple projectors 512, gaze tracker(s) 520, and lenses that include the holographic combiners 550, for example implemented as one or more layers of holographic film on either side of, or embedded in, the lenses. The lenses may be curved glass or plastic with optical power depending on the user's particular requirements, or alternatively curved glass or plastic with no optical power. In this example embodiment, the system 500 includes three projectors 512 for each eye (projectors 512A-512C for the right eye, and projectors 512D-512F for the right eye), a gaze tracker 520 for each eye (gaze tracker 520A for the right eye, and gaze tracker 520B for the left eye), and a lens with holographic combiner 550 for each eye.

In some embodiments, the MR system 500 may also include a separate control box 502 that includes three light sources 510 for each eye (projectors 510A-510C for the right eye, and projectors 510D-510F for the right eye), and a controller 504 and power supply 506 for the MR system 500. The light sources 510 may, for example, be RGB lasers. The control box 502 may, for example, be worn on the user's hip, or otherwise carried or worn by the user. The light sources 510 may be coupled to the projectors 512 by fiber optic cables 514, with each light source 510 coupled to a respective projector 512. In some embodiments, the control box 502 may include separate sets of light sources 510 for each eye 590, with the light sources 510 for each eye connected to the projectors 512 on respective sides of the frame 501 by the fiber optic cables 514. The light sources 510, fiber optic cables 514, and projectors 512 for a given eye 590 may be referred to as a light engine 508 for that eye 590. Thus, the system 500 may include two light engines 508, with one for each eye 590.

The controller 504 may control operation of the light engine(s) 508. The controller 504 may be integrated in the control box 502, or alternatively may be implemented at least in part by a device (e.g., a personal computer, laptop or notebook computer, smartphone, pad or tablet device, game controller, etc.) coupled to the control box 502 via a wired or wireless (e.g., Bluetooth) connection. The controller 504 may include one or more of various types of processors, CPUs, image signal processors (ISPs), graphics processing units (GPUs), coder/decoders (codecs), memory, and/or other components. The controller 504 may, for example, generate virtual content for projection by the light engine(s) 508. The controller 504 may also direct operation of the light engine(s) 508, in some embodiments based at least in part on input from gaze tracking 520 component(s) of the headset. The gaze tracking 520 component(s) may be implemented according to any of a variety of gaze tracking technologies, and may provide gaze tracking input to the controller 504 so that projection by the light engine(s) 508 can be adjusted according to current position of the subject's eyes 590. For example, different ones of the light sources 510 and projectors 512 may be activated to project light onto different eye box 560 points based on the current position of the subject's eyes 590.

In some embodiments, the holographic combiners 550 may be recorded with a series of point to point holograms; one projection point interacts with multiple holograms to project light onto multiple eye box 560 points. In some embodiments, the holograms are arranged so that neighboring eye box 560 points are illuminated from different projectors 512. In some embodiments, the holographic combiners 550 and projectors 512 may be arranged to separately project light fields with different fields of view and resolution that optimize performance, system complexity and efficiency, so as to match the visual acuity of the eye. In some embodiments, the projectors 512 may each include a two-axis scanning mirror (e.g., a MEMS mirror) that scans the light beam from a respective light source 510 to a respective holographic combiner 550. The light sources 510 may be appropriately modulated (e.g., by controller 504) to generate a desired image. In some embodiments, only one light source 510 and projector 512 (per eye) is active at a given time; when activated, a projector 512 projects light from a corresponding light source 510 (e.g., an RGB laser) to all of its eye box 560 points. However, in some embodiments, more than one light source 510 and projector 512, or all of the light sources 510 and projectors 512, may be active at the same time.

In some embodiments, each projector 512 may include optical elements that focus the light beam before scanning such that, once reflected off the holographic combiner 550, the light is substantially collimated when it enters the subject's eye 590. In some embodiments, each projector 512 may also include an active focusing element that may, for example, be used to change focus of the light beam as the light beam is scanned across a slow (horizontal) axis by the scanning mirror. Active focusing may also enable beams that diverge into the eye to, rather than being collimated, match the beam divergence of the supposed depth of the virtual object(s) being projected.

FIG. 9 illustrates an example eye box 560 of an MR system, according to some embodiments. As shown in FIG. 9, in this example, there may be 27 eye box points 562 arranged in five horizontal rows that are spaced to form a hexagonal pattern, with five eye box points 562 in the first, third, and fifth rows, and seven eye box points 562 in the second and fourth rows. There are seven eye box points 562 for projector 512A, ten for projector 512B, and ten for projector 512C. Pitch between neighboring eye box points 562 is approximately 2.6 mm. Eye box points 562 of the three projectors 512A, 512B, and 512C are positioned in the rows such that pitch between any two eye box points 562 of a given projector 512 is approximately 4.5 mm. The large circle represents position and size of the subject's pupil. The MR system may use the gaze tracking component to detect position (and size) of the pupil, and use that information to select a suitable projector 512 to activate, while deactivating the other projectors 512. In this example, the pupil is substantially centered on eye box point 562A of projector 512A, so projector 512A is activated. Note that all of projector 512A's eye box points 562 are illuminated when projector 512A is active. The subject's pupil should be in the plane of the eye box 560. The different eye box points 562 may, for example, compensate for differences in interpupillary distances (IPDs) between subjects, and for eye movements or rotations that place different points 562 in the subject's pupil.

In FIG. 9, the large circle represents the largest pupil diameter (@5.3 mm) that can be accommodated by the example eye box 560 in a worst case scenario when the subject's pupil is pointed at a center point between three eye box points. In this case, any of the projectors 512 are equally suitable to project, while the other two projectors 512 are turned off. In this example, projector 512A is activated, while projectors 512B and 512C are off, so the subject's pupil is receiving light from eye box point 562A. Note that, if the subject's pupil gets any larger, light from neighboring projector 512A eye box point 562B may enter the subject's pupil. In some embodiments, to accommodate a range of possible user interpupillary distances (IPDs) and pupil diameters, holographic combiners may be provided with holograms that are tailored for particular users or for particular ranges, for example to provide additional spacing between neighboring eye box points 562 for users with larger maximum pupil diameters. Alternatively, in some embodiments, additional projectors 512 (e.g., four, five, or six projectors 512) may be used so that the eye box points 562 for a given projector 512 can be spaced farther apart.

Non-Linear Slow Axis Scan

In some embodiments, instead of performing a linear slow-axis scan to the subject's eye, the scanning mirrors of projectors 512 may be configured or programmed to perform a non-linear slow axis scan. FIGS. 10A and 10B illustrate linear and non-linear slow axis scans in an MR system, according to some embodiments. FIG. 10A illustrates a slow axis scan performed by a scanning mirror of one of the projectors 512 to holograms on a holographic combiner 550 from a projection point 1000 corresponding to the projector 512. FIG. 10B illustrates the distribution and resolution of pixels into the subject's eye for a linear slow axis scan (the dotted curve) compared to the resolution of pixels into the subject's eye for a non-linear slow axis scan (the dashed curve). As can be seen in FIGS. 10A and 10B, using a linear slow-axis scan results in a non-linear distribution of pixels into the eye box.

A reason for performing a non-linear scan is the number of available pixels. To more optimally distribute the available pixels to the subject's eye, a non-linear scan may be used to foveate the image so that more pixels are used near the center of the image where the subject's eye resolution is highest than are used in the peripheral regions of the image. Another reason for performing a non-linear scan is the trigonometry of the MR system; as can be seen in FIG. 10A, each projector 512 project from a point 1000 off to the side of the holographic combiner 550 at a relatively shallow angle to the combiner 550. Roughly half of the projector scan angle (from extreme 1012A to center 1014), corresponds to roughly a third of the field of view (FOV) into the eye box point 1010. If the pixels were spread evenly across the projector scan, the resolution into the subject's eye would decrease from extreme 1012A to extreme 1012B according to the dotted curve in FIG. 10B. The dashed curve in FIG. 10B represents the target foveated resolution across the FOV.

The optimal non-linear slow axis scan may be different at different eye box position. Thus, in some embodiments, the scanning mirrors may be programmed with multiple (e.g., 5) non-linear slow axis scans that can be applied at different eye box points.

Alternative Embodiments

In some embodiments, instead of the light sources being located in a control box and coupled to the projectors via fiber optic cables as illustrated in FIG. 5, the light sources may instead be coupled directly to the projectors in an on-frame unit. FIG. 11 illustrates an embodiment of an MR system in which the projectors and light sources are contained in an on-frame unit. In these embodiments, the MR system 1300 may include a headset (e.g., a helmet, goggles, or glasses) that includes a frame 1301, an on-frame unit including multiple light sources 1310 (three, in this example) coupled to projectors 1312 (three, in this example), a gaze tracking component (gaze tracker 1320), and a lens that includes a holographic combiner 1350, for example implemented as one or more layers of holographic film on either side of, or embedded in, the lens. The lens may be a piece of curved glass or plastic with optical power depending on the user's particular requirements, or alternatively a piece of curved glass or plastic with no optical power. Note that, for simplicity, the system 1300 is shown for only one eye; generally but not necessarily, there will be light sources 1310, projectors 1312, a gaze tracker 1320, and a lens with holographic combiner 1350 for the second eye. The on-frame unit 1302 may also include a controller 1304 and a power supply (not shown). Alternatively, the controller 1304 and/or power supply may be implemented in a separate unit or device that is coupled to the on-frame unit via a physical cable and/or a wireless connection.

In some embodiments, the system 1300 may include multiple independent light sources 1310 (e.g., laser diodes, LEDs, etc.) that may emit light beams, under control of the controller 1304, that are independently projected by respective projectors 1312. As shown in this example, in some embodiments, there may be three light sources 1310A-1310C coupled to three projectors 1312A-1312C; however, there may be more or fewer light sources and projectors in some embodiments. FIG. 7 shows an example projector that may be used as projectors 1312A-1312C. In some embodiments, each projector 1312 may scan a light beam from a respective light source 1310 to the holographic combiner 1350. The light sources 1310 may be appropriately modulated (e.g., by controller 1304) to generate a desired image. In some embodiments, only one light source 1310 and projector 1312 (per eye) is active at a given time; when activated, a projector 1312 projects light from a corresponding light source 1310 (e.g., an RGB laser) to all of its eye box 1360 points. However, in some embodiments, more than one light source 1310 and projector 1312, or all of the light sources 1310 and projectors 1312, may be active at the same time.

Figure 12:
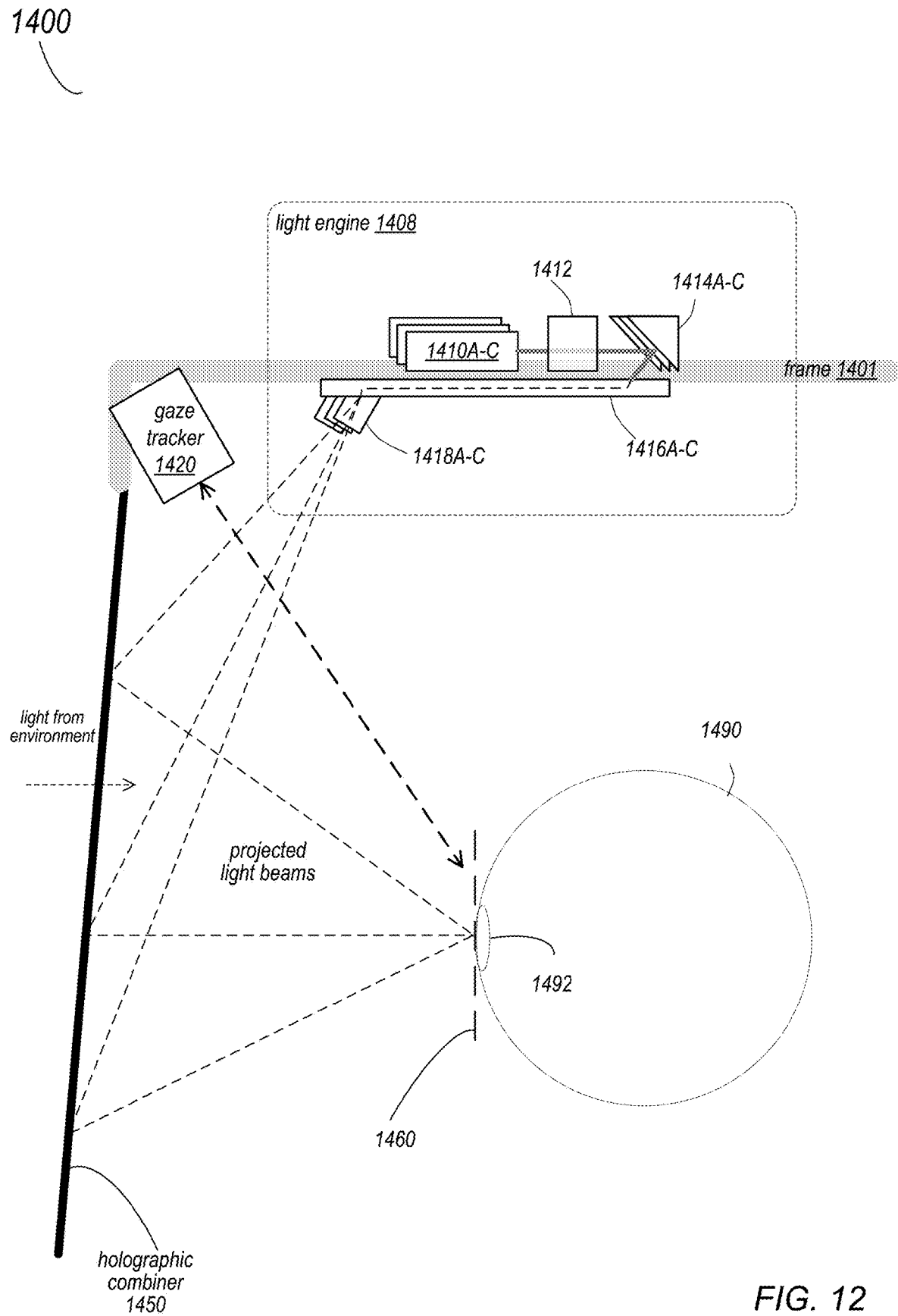
FIG. 12 illustrates a light engine in an MR system that uses a single scanning mirror and waveguides to direct light from multiple independent light sources to focusing elements that provide different projection points to a reflective holographic combiner, according to some embodiments.
Figure 13:
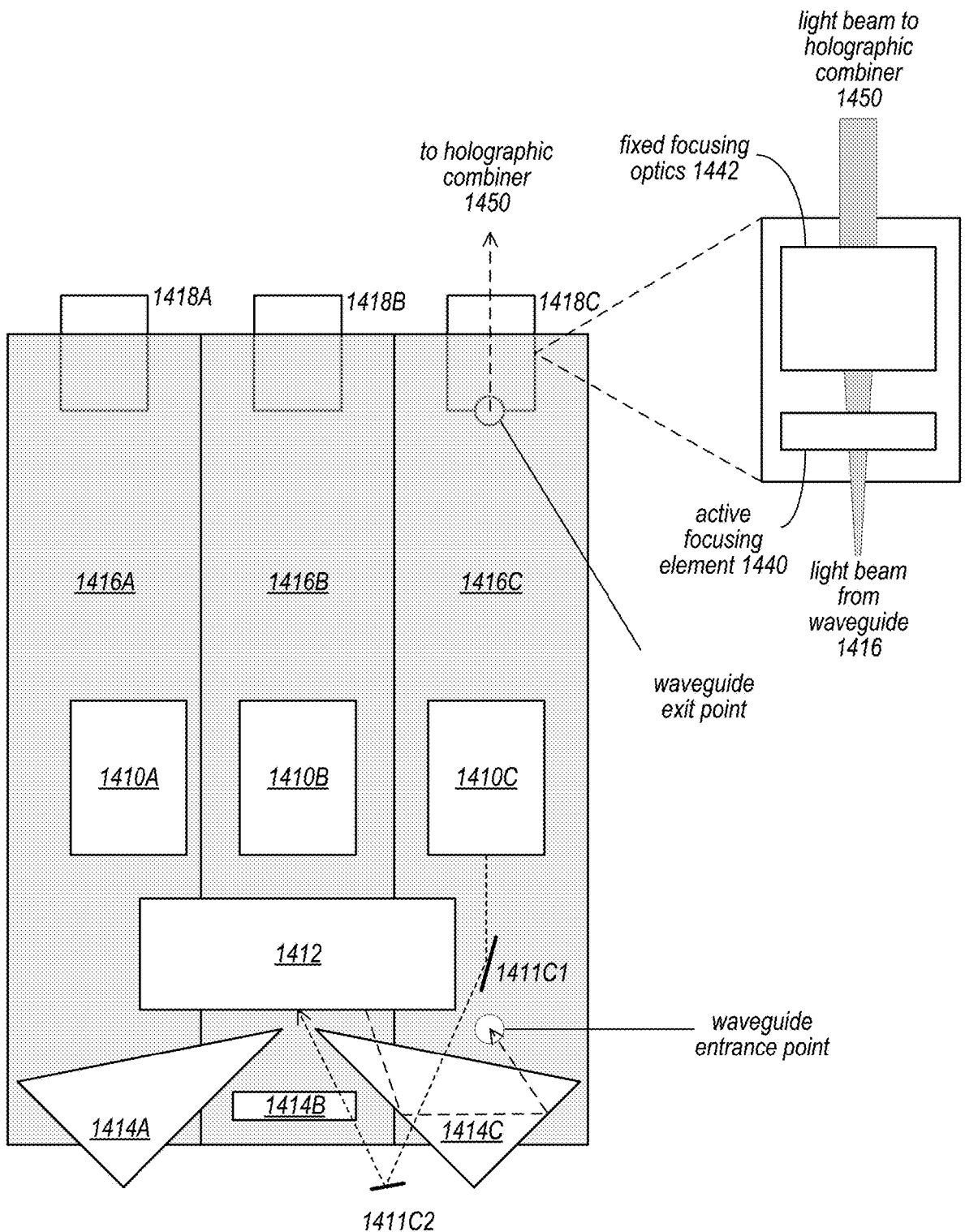
FIG. 13 further illustrates components of a light engine as illustrated in FIG. 12, according to some embodiments.

FIG. 12 illustrates a light engine in an MR system that uses a single scanning mirror and waveguides to direct light from multiple independent light sources to focusing elements that provide different projection points to a reflective holographic combiner, according to some embodiments. FIG. 13 further illustrates components of a light engine as illustrated in FIG. 12, according to some embodiments. MR system 1400 may include a headset (e.g., a helmet, goggles, or glasses) that includes a frame 1401, an on-frame light engine 1408, a gaze tracking component (gaze tracker 1420), and a lens that includes a holographic combiner 1450, for example implemented as one or more layers of holographic film on either side of, or embedded in, the lens.

Light engine 1408 may include three light sources 1410A-1410C (e.g., RGB lasers), a single two-axis scanning mirror 1412 (e.g., a MEMS mirror), and three fixed mirrors 1414A-1414C that reflect scanned light from scanning mirror 1412 to entrance points on respective pupil-expanding optical waveguides 1416A-1416C. Light engine 1408 may also include one or more mirrors 1411 for each light source 1410 (mirrors 1411C1 and 1411C2 for light source 1410C are shown) that direct the light beam emitted by the respective light source 1410 to an entrance window of scanning mirror 1412. The scanned light from scanning mirror 1412 is reflected by fixed mirrors 1414A-1414C, enters respective waveguides 1416A-1416C at entrance points, and exits the waveguides 1416A-1416C at exit points corresponding to respective focusing components 1418A-1418C that focus and/or collimate the light beam projected to the holographic combiner 1450. In some embodiments, the entrance and exit points may be implemented as holograms using a holographic film. Alternatively, the entrance and exit points may be implemented as surface relief gratings (SRG), which are typically created using lithographic techniques rather than a holographic film. As shown in FIG. 12, each focusing component 1418 may include an active focusing element 1440 that may, for example, be used to change focus of the light beam as the light beam is scanned across a slow (horizontal) axis by the scanning mirror, and may also include fixed focusing optics 1442.

Scanning Mirror Embodiments

Embodiments of MR systems as illustrated in FIGS. 5 through 13 may use two-axis scanning mirrors, for example MEMS mirrors, to scan modulated light beams emitted by light sources (e.g., RGB lasers). In embodiments, the scanning mirrors may be configured to perform a slow scan on the horizontal axis, and a fast scan on the vertical axis. In some embodiments, the scanning mirrors may use electromagnetic (EM) actuation technology. However, other actuation technologies, for example electrostatic or piezoelectric actuation technologies, may be used in some embodiments. These other actuation technologies may, for example, reduce power consumption when compared to EM actuation technologies.

FIGS. 14A and 14B illustrate using resonance techniques on both axes of a scanning mirror, according to some embodiments. In some embodiments, the two-axis scanning mirrors may be configured to scan using a Lissajous curve or pattern in which both axes are resonant, but one axis (e.g., the vertical axis) is faster than the other axis. A Lissajous curve is the graph of a system of parametric equations which describe complex harmonic motion. FIG. 14A illustrates a relatively simple Lissajous pattern. FIG. 14B illustrates an example Lissajous pattern that may be used in some embodiments. As mentioned above in reference to FIGS. 10A and 10B, a non-linear scan is desirable due to the trigonometry of the MR system and the need to foveate the image so that more pixels are used near the center of the image where the subject's eye resolution is highest. In some embodiments, a Lissajous scanning pattern similar to the pattern shown in FIG. 14B may be generated by software that encodes a system of parametric equations to provide a foveated distribution of pixels to the subject's eyes.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   a controller;
   a reflective holographic combiner comprising a plurality of point-to-point holograms;
   a plurality of light sources that emit light beams under control of the controller;
   a scanning mirror that scans the light beams emitted by the plurality of light sources to a plurality of fixed mirrors, wherein the fixed mirrors reflect the scanned light beams from the scanning mirror to entrance points on respective waveguides;
   wherein the light beams exit the respective waveguides at exit points of the respective waveguides to corresponding focusing components that project the light beams to the holographic combiner;
   wherein the plurality of point-to-point holograms of the holographic combiner redirect the light beams received from the focusing components to a plurality of eye box points so that each light beam is scanned to two or more of the plurality of holograms, wherein the two or more holograms redirect the light beam to illuminate two or more respective eye box points such that neighboring eye box points are illuminated by different ones of the light beams.

2. The system of claim 1, wherein the plurality of fixed mirrors includes at least one light folding element configured to change directions of corresponding light beams scanned by the scanning mirror multiple times to the entrance points on corresponding at least one waveguide.

3. The system of claim 1, wherein at least one of the focusing components includes an active focusing element configured to change focus of corresponding light beams as the light beams are scanned across a horizontal axis of the holographic combiner by the scanning mirror.

4. The system of claim 1, wherein the holographic combiner is implemented as one or more layers of holographic film on a side of a lens or embedded in the lens.

5. The system of claim 1, wherein the entrance points and exit points of at least one of the waveguides are implemented using a holographic film.

6. The system of claim 1, wherein the entrance points and exit points of at least one of the waveguides are implemented as surface relief gratings (SRG).

7. The system of claim 1, wherein the scanning mirror is a two-axis scanning mirror.

8. The system of claim 1, wherein the light sources are RGB lasers.

9. The system of claim 1, further comprising:
   one or more mirrors for at least one of the light sources, wherein the one or more mirrors reflect the light beams emitted by the at least one light source to the scanning mirror.

10. The system of claim, 1, further comprising:
    a gaze tracking component configured to track position of a subject's eye.

11. A method, comprising:
    emitting, by a plurality of light sources under control of a controller, light beams;
    scanning, by a scanning mirror, the light beams emitted by the plurality of light sources to a plurality of fixed mirrors;
    reflecting, by the plurality of fixed mirrors, the light beams from the scanning mirror to entrance points on respective waveguides;
    directing, by the respective waveguides, the light beams from the entrance points to exit the respective waveguides from exit points to respective focusing components that project the light beams to a holographic combiner; and
    redirecting, by a plurality of point-to-point holograms of the holographic combiner, the light beams received from the focusing components to a plurality of eye box points so that each light beam is scanned to two or more of the plurality of holograms, wherein the two or more holograms redirect the light beam to illuminate two or more respective eye box points such that neighboring eye box points are illuminated by different ones of the light beams.

12. The method of claim 11, wherein the plurality of fixed mirrors includes at least one light folding element, and wherein the method further comprises:
    changing, by the at least one light folding element, directions of corresponding light beams scanned by the scanning mirror multiple times to the entrance points on corresponding at least one waveguide.

13. The method of claim 11, wherein at least one of the focusing components includes an active focusing element, and wherein the method further comprises:
    changing, by the active focusing element of the at least one focusing component, focus of corresponding light beams as the light beams are scanned across a horizontal axis of the holographic combiner by the scanning mirror.

14. The method of claim 11, wherein the holographic combiner is implemented as one or more layers of holographic film on a side of a lens or embedded in the lens.

15. The method of claim 11, wherein the entrance points and exit points of at least one of the waveguides are implemented using a holographic film.

16. The method of claim 11, wherein the entrance points and exit points of at least one of the waveguides are implemented as surface relief gratings (SRG).

17. The method of claim 11, wherein the scanning mirror is a two-axis scanning mirror.

18. The method of claim 11, wherein the light sources are RGB lasers.

19. The method of claim 11, further comprising:
reflecting, by one or more additional mirrors for at least one of the light sources, the light beams emitted by the at least one light source to the scanning mirror.

20. The method of claim 11, further comprising:
tracking, by a gaze tracking component, position of a subject's eye.

\* \* \* \* \*